COLOR TELEVISION RECEIVER SIGNAL TRANSFER SYSTEM

Filed April 23, 1954 8 Sheets-Sheet 1

INVENTORS
EUGENE O. KEIZER
BY & LESLIE L. BURNS, JR.
ATTORNEY

COLOR TELEVISION RECEIVER SIGNAL TRANSFER SYSTEM

Filed April 23, 1954 8 Sheets-Sheet 2

INVENTORS
EUGENE O. KEIZER
BY & LESLIE L. BURNS, JR.
[signature]
ATTORNEY

INVENTORS
EUGENE O. KEIZER
& LESLIE L. BURNS, JR.
BY [signature]
ATTORNEY

COLOR TELEVISION RECEIVER SIGNAL TRANSFER SYSTEM

INVENTORS
EUGENE O. KEIZER
& LESLIE L. BURNS, JR.
BY [signature]
ATTORNEY

COLOR TELEVISION RECEIVER SIGNAL TRANSFER SYSTEM

Filed April 23, 1954 8 Sheets-Sheet 5

RESPONSE CURVES FOR LOGARITHMIC MATCHING ROUND-TOPPED I.F.

INVENTORS
EUGENE O. KEIZER
BY & LESLIE L. BURNS, JR.
[signature]
ATTORNEY

June 20, 1961 E. O. KEIZER ET AL 2,989,581

COLOR TELEVISION RECEIVER SIGNAL TRANSFER SYSTEM

Filed April 23, 1954 8 Sheets-Sheet 6

INVENTORS
EUGENE O. KEIZER
&LESLIE L. BURNS, JR.
BY [signature]
ATTORNEY

COLOR TELEVISION RECEIVER SIGNAL TRANSFER SYSTEM

INVENTORS
EUGENE O. KEIZER
BY & LESLIE L. BURNS, JR.
Edwin C. Mitchell
ATTORNEY

June 20, 1961 E. O. KEIZER ET AL 2,989,581

COLOR TELEVISION RECEIVER SIGNAL TRANSFER SYSTEM

Filed April 23, 1954 8 Sheets-Sheet 8

INVENTORS
EUGENE O. KEIZER
BY & LESLIE L. BURNS, JR.
ATTORNEY 2,989,581

COLOR TELEVISION RECEIVER SIGNAL TRANSFER SYSTEM

Eugene O. Keizer and Leslie L. Burns, Jr., Princeton, N.J., assignors to Radio Corporation of America, a corporation of Delaware Filed Apr. 23, 1954, Ser. No. 425,106
16 Claims. (Cl. 178—5.4)

The present invention relates to intermediate frequency amplifiers and video amplifiers utilized in superheterodyne receivers, and in particular to matched and compensating intermediate frequency and video amplifiers for use in color television receivers.

Color television signals utilize fully the six megacycle band assigned. In addition to the usual brightness information and the sound channel, the color information is transmitted on a suppressed subcarrier of the picture carrier. This color information consists of two signals known as the I and Q signals. The 3.58 mc. color subcarrier is quadrature modulated by these two color signals. The bandwidth of the I and Q signals is such that the sidebands of the subcarrier extend up to over 4.2 mc. from the picture carrier. Any distortion in the upper edge of the band will therefore result in loss of color fidelity.

According to the present invention there is provided apparatus for more readily achieving the wide bandwidth necessary for faithful color reproduction while retaining adequate sound rejection to minimize the possibility of cross modulation and sound in the picture. The practice of this invention provides a system that is less sensitive to drift or adjustment of the heterodyne oscillator. These desirable results are achieved by a unique and novel apparatus for attenuating the single sideband portion of the signal in the intermediate frequency amplifier and compensating for this attenuation in the video amplifier.

It is therefore an object of this invention to provide a simplified matched IF and video amplifier system for obtaining the wide bandwidth necessary for color television receiver.

Another object of this invention is to provide an improved means of achieving the prescribed desirable cutoff characteristics at the higher video frequency edge of the pass band.

Another object of this invention is to provide a matched IF and video amplifier system for improved response to high bandwidth signals.

Another object of this invention is to provide an amplifier which has an exponential response with respect to frequency.

Another object of this invention is to provide a complementary IF-video amplifier response in a color television receiver which minimizes the effect of off frequency tuning.

Another object of this invention is to provide decreased cross-modulation between the sound carrier and the color subcarrier in a color television receiver resulting from off tuning.

Another object of the invention is to minimize distortion inherent in vestigial side band transmission by reducing the amplitudes of the single side band region in the IF amplifier with respect to the carrier region.

Another object of this invention is to transfer the major portion of sound carrier trapping to the video amplifier from the IF amplifier in a television receiver.

Another object of the invention is to provide an IF-video system for color television which does not require a separate detector for sound removal.

A still further object of this invention is to provide a means for achieving a higher gain with fewer stages of amplification in the IF amplifier of a television receiver.

Still another object of this invention is to provide for improved IF amplifier stability in a superheterodyne receiver.

A yet further object of this invention is to provide a complementary exponential frequency response IF-video amplifier system in a color television receiver which yields improved stability while retaining adequate sound carrier rejection.

According to this invention a round top IF band pass characteristic is employed in a color television receiver, with this characteristic matched by a complementary frequency response curve in the video amplifier. The IF frequency response characteristic is so shaped that prior to the color subcarrier and thereon to the sound carrier the IF amplifier response decreases smoothly to be matched by a smoothly increasing gain versus frequency response in the video amplifier. This shifts the critical part of the selectivity design of the IF amplifier to the video portion of the receiver and permits a stable wide band characteristic with an IF amplifier of much simpler design in addition to making the color television receiver relatively insensitive to tuning deviations.

In one form of the invention the frequency response curve of the IF amplifier in the vestigial sideband region is substantially an exponential curve with respect to frequency, and the frequency versus gain response curve of the video amplifier is a complementary exponential curve so that the IF and video amplifier stages yield substantially flat response characteristics for the entire width of the television pass band. The use of the complementary exponential frequency characteristic curves has the further advantage of making the color television receiver comparatively insensitive to changes in fine tuning.

Other and incidental objects and advantages of the present invention will become apparent upon a reading of the specification and an inspection of the accompanying drawings in which:

FIGURE 1 shows the picture transmission amplitude characteristic of a transmitted color television signal including the sound carrier;

FIGURE 2*a* shows the luminance channel and the sound carrier;

FIGURE 2*b* shows the Q channel;

FIGURE 2*c* shows an I channel;

FIGURE 3 shows the block diagram of a color television receiver according to this invention;

FIGURE 4*a* shows a conventional overall RF-IF response characteristic curve;

FIGURE 4*b* shows a conventional video amplifier response curve;

FIGURE 4*c* shows the desired overall picture signal amplitude response characteristic desired of a color television receiver;

FIGURE 5*a* shows the schematic diagram of an amplifier circuit having a resonant load;

FIGURE 5*b* shows typical gain versus frequency characteristics of the amplifier in FIGURE 5*a*;

Figure 8A:
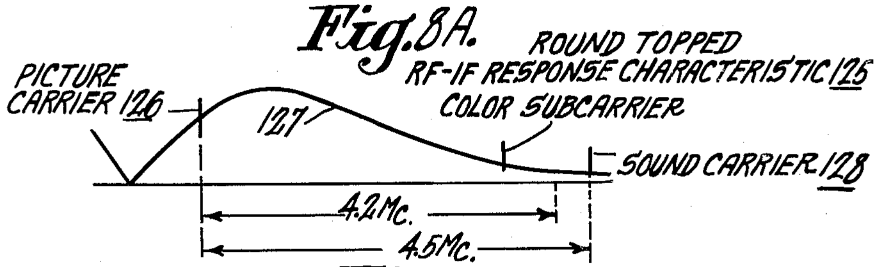
Figure 8B:
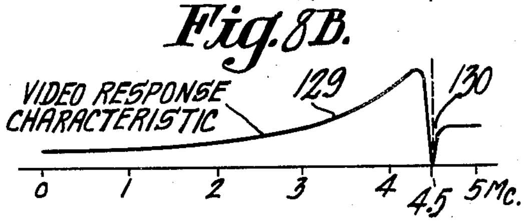
Figure 8C:
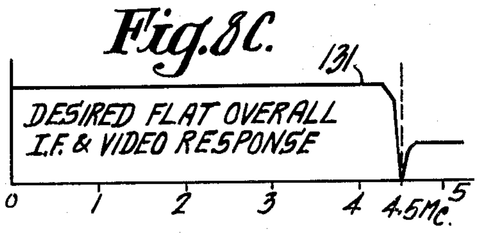
Figure 9:
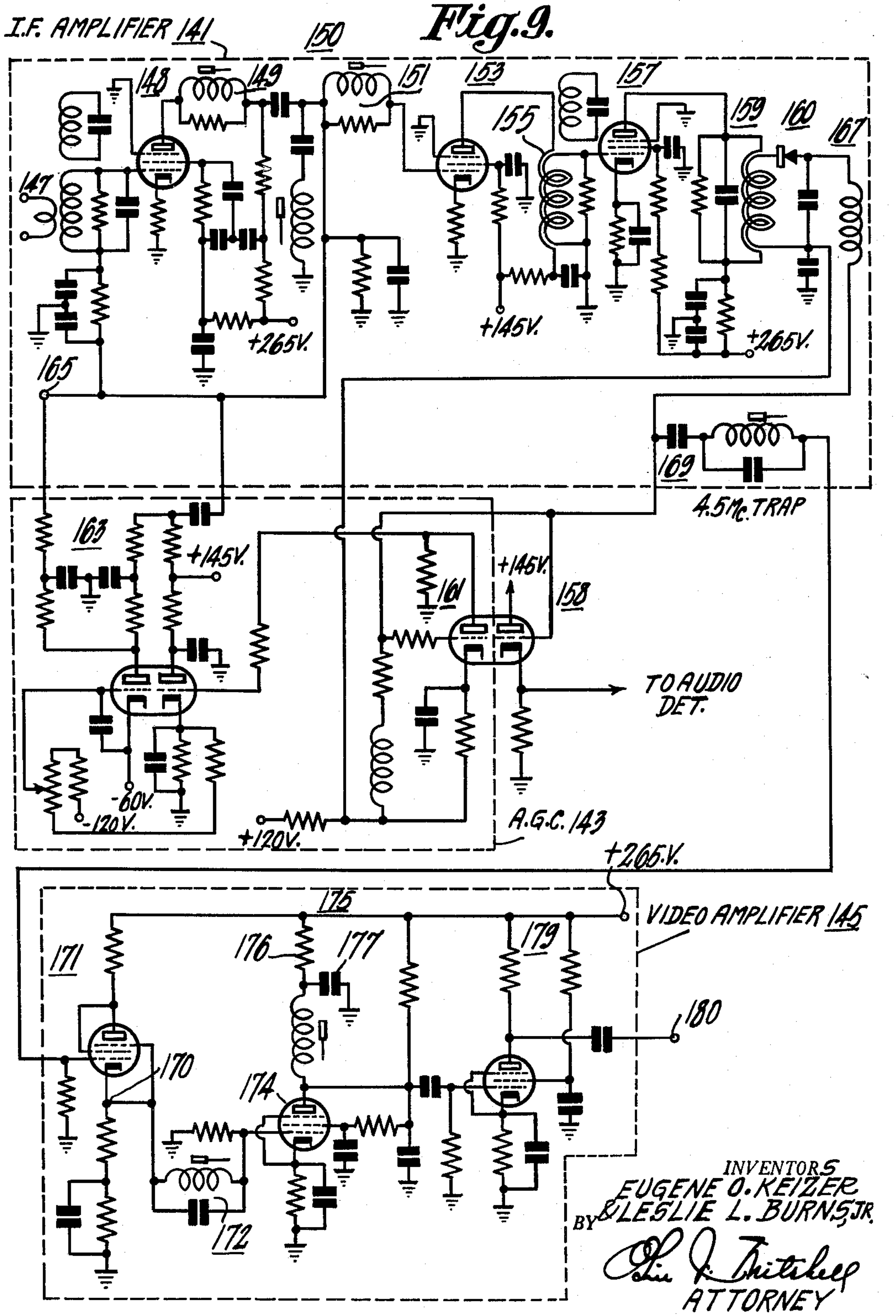
Figure 10:
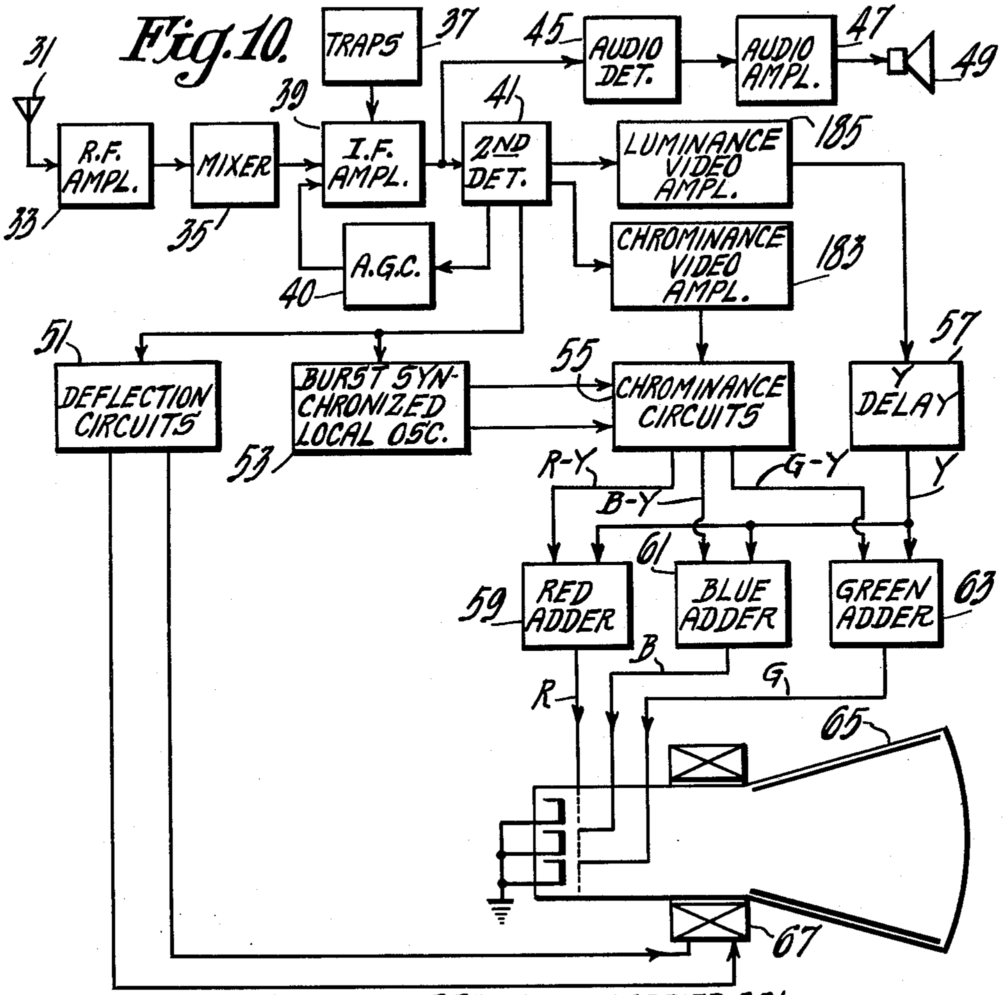
Figure 11:
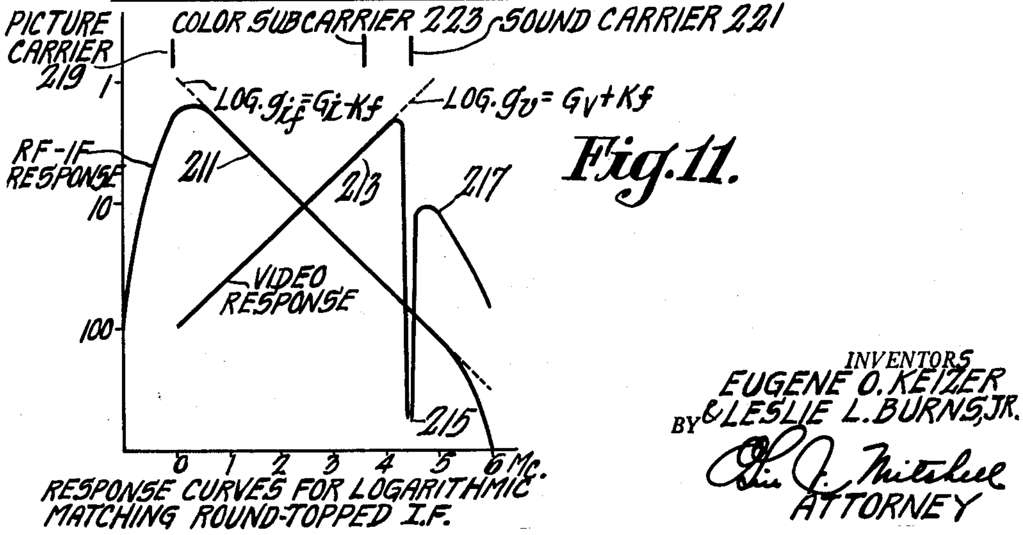
Figure 12A:
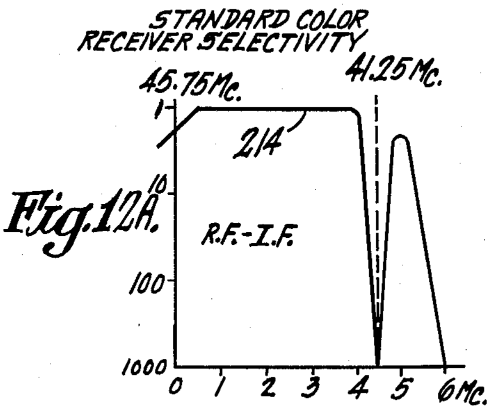
Figure 12D:
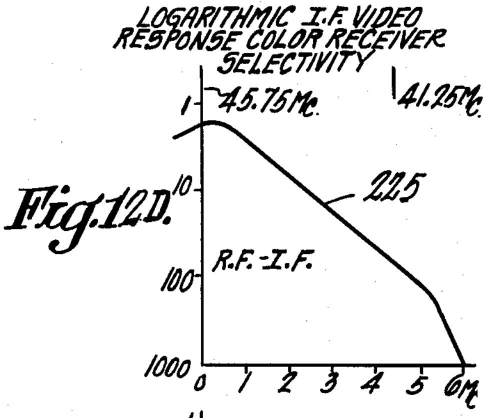
Figure 12B:
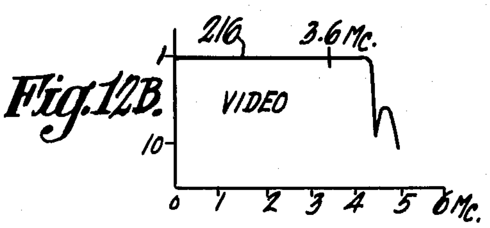
Figure 12E:
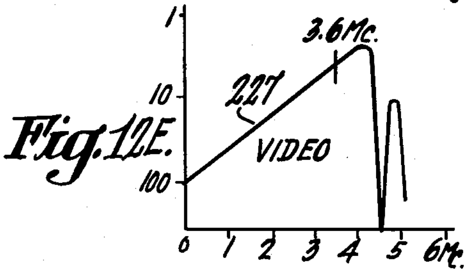
Figure 12C:
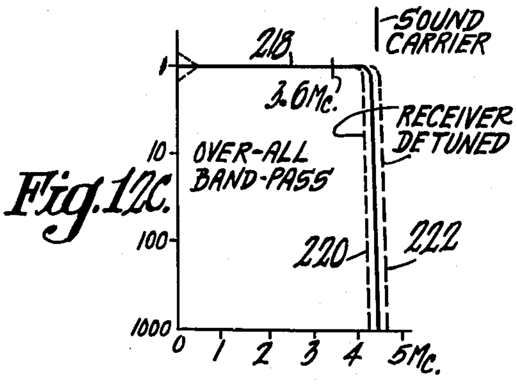
Figure 12F:
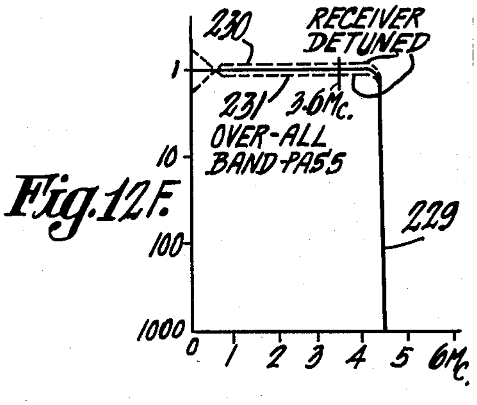
Figures 13, 14A, 14B:
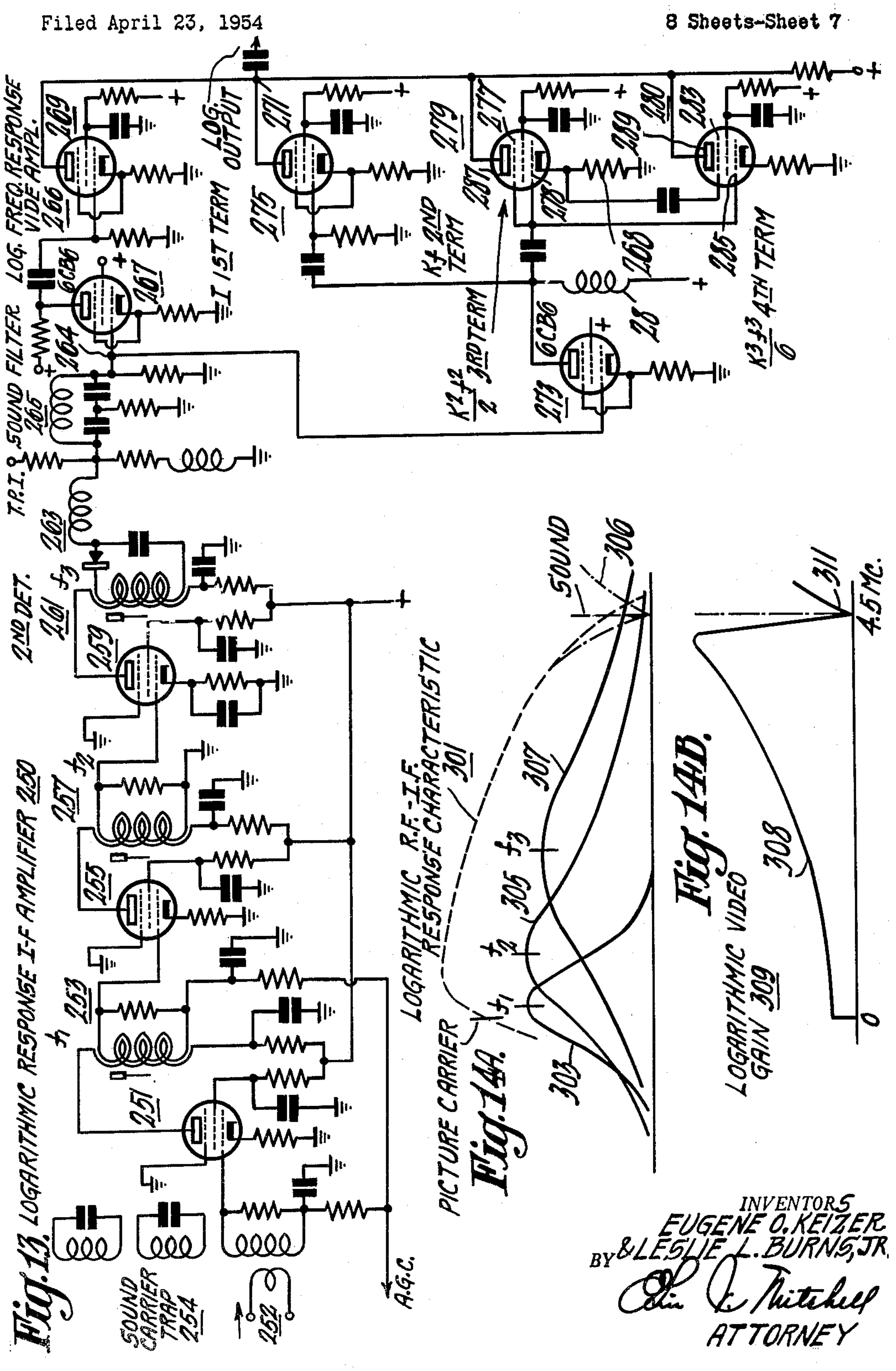
Figures 15, 16:
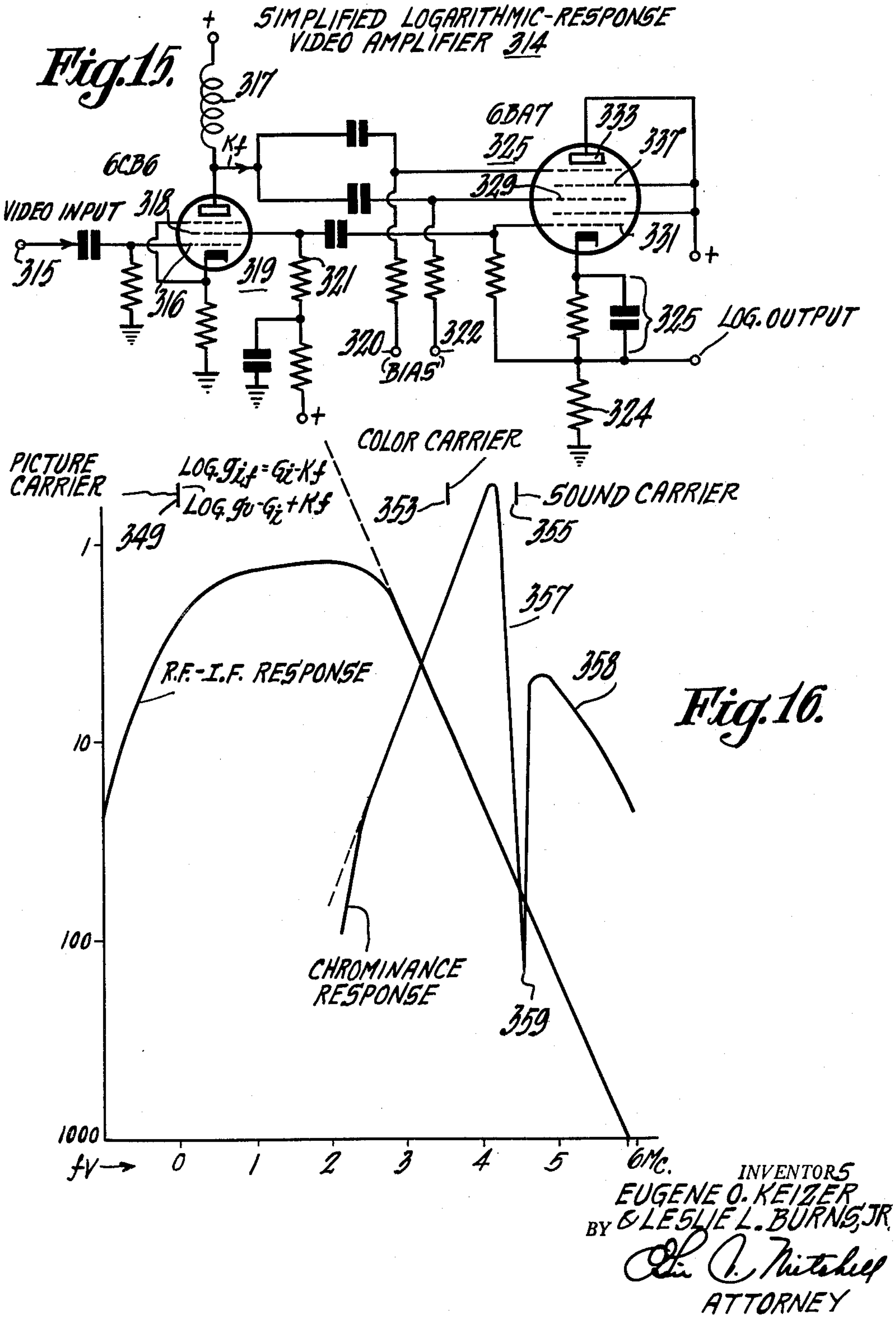

FIGURE 8*a* shows an RF-IF round top response characteristic;

FIGURE 8*b* shows the complementary video response characteristic which matches the characteristic shown in FIGURE 8*a*;

FIGURE 8*c* shows the desired flat overall IF-video response;

FIGURE 9 shows the schematic diagram of an IF amplifier, AGC circuit, second detector, video amplifier, and trap system which employs a round top complementary IF-video amplifier response characteristic;

FIGURE 10 shows by block diagram, a color television receiver;

FIGURE 11 shows the response curves for logarithmic matched round-top IF and video amplifier systems;

FIGURE 12*a* shows standard color receiver IF selectivity;

FIGURE 12*b* shows standard color receiver video selectivity;

FIGURE 12*c* shows a standard color receiver overall band pass with the effect of receiver detuning;

FIGURE 12*d* shows the logarithmic IF response curve;

FIGURE 12*e* shows the logarithmic video response curve;

FIGURE 12*f* shows the overall band pass response of a color receiver having a logarithmic complementary IF-video response curve showing the effect of receiver detuning;

FIGURE 13 show a schematic diagram of a logarithmic response IF amplifier coupled to a logarithmic response video amplifier;

FIGURE 14*a* shows the manner of utilizing the staggered tuned IF amplifier in FIGURE 13 to produce the required logarithmic IF response characteristic;

FIGURE 14*b* shows the logarithmic video gain curve afforded by the logarithmic response video amplifier in FIGURE 13;

FIGURE 15 shows a simplified logarithmic response video amplifier circuit; and

FIGURE 16 shows a hybrid logarithmic IF response characteristic and a logarithmic video response which is complementary in the vicinity of the color subcarrier so as to make the flatness of the color receiver chrominance channel responses relatively independent of fine tuner adjustment.

The present invention relates to the matching of the IF frequency response curve with the video response curve to bring about certain improvements in performance of a color television receiver in addition to considerable simplification in its design. It is to be noted at this point, however, that the present invention does not relate solely to compensation of one or the other or both of the aforementioned characteristic curves. In the earlier days of the television receiver art it was difficult to design video amplifiers which had the wide bandwidths necessary for high fidelity television reception and reproduction and it was found that one way of overcoming this hurdle was to peak the intermediate frequency amplifier so that the higher frequencies were given increased amplification to make up for the loss in gain in the video amplifier at the higher frequencies.

One of the earliest applications of the processes of compensation in either the video amplifier or in the output audio amplifier was that described by Robinson in connection with the "Stenode Receiver" in the "Wireless World" in 1941 in which it was recognized that the overall RF and IF characteristics are usually not ideal flat top with steep cut-off sides. The technique was then adopted at this early date wherein the high audio frequency response was peaked in order to compensate for the attenuation caused by the gradual slope of imperfect RF-IF characteristics. Such an approach, however, resulted in making the radio receiver extremely sensitive to tuning and actually did not improve the signal-to-noise ratio for which the technique was originally prescribed.

The present invention will describe many aspects of what will be called complementary IF-video response matching utilizing matching curves of an exponential nature all of which will be shown to have considerable engineering advances with particular regard to rendering the receiver relatively insensitive to deviations in fine tuning.

Figure 1:
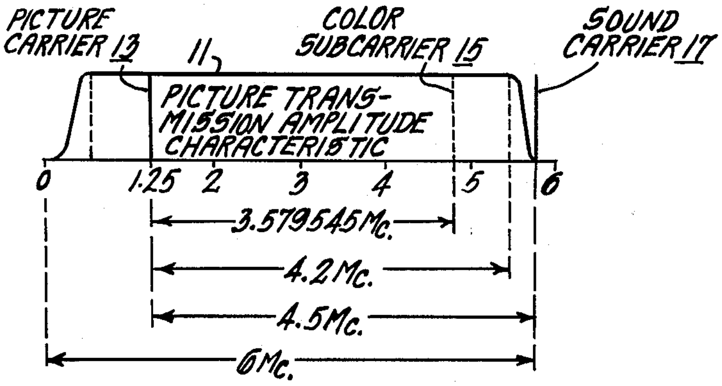

As has been mentioned earlier in the specification, the advent of color television brought with it new demands on the various portions of the color television receiver. One of these demands was linked with the increased amount of information and the increased bandwidth which was utilized to deal with the increased information. FIGURE 1 shows the bandwidth necessary for picture transmission showing the total bandwidth 6 mc. wide as specified by the Federal Communications Commission; the picture carrier is located 1¼ mc. from one end of the band and the color subcarrier then displaced approximately 3.58 mc. from the picture carrier, with the sound carrier very close to the outer edge of the picture transmission band. It is to be noted that there are actually two carriers which are transmitted, namely the picture carrier 13, and the sound carrier 17. The picture carrier 15 is modulated by the monochrome and color information, with the mode of transmission used being that employing vestigial sideband transmission. The use of vestigial sideband transmission was employed, of course, to economize on bandwidth. The sound is transmitted using frequency modulation with the sound carrier located 4½ mc. from the picture carrier.

Figure 2A:
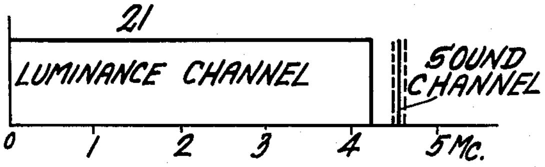

FIGURE 2*a* shows then the luminance channel 21 which indicates the monochrome information which is contained in the color television picture. It is seen from the diagram that the luminance channel 21 includes frequencies up to approximately 4.2 mc.

Figure 2B:
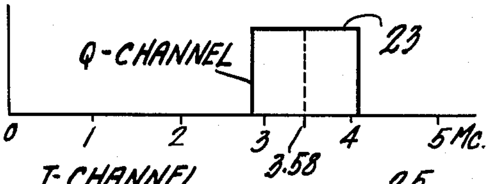

The color or chrominance information is included by the use of two color signals, one denoted as the Q signal which includes substantially green-purple color axis information and the other known as the I signal which includes substantially orange-cyan color axis information. The I and Q signals are transmitted on a color subcarrier by using the method of suppressed carrier quadrature modulation. The color subcarrier is located in the luminance channel at 3.58 mc. as is seen in FIGURE 2*b*. Since the Q signal is a signal having colors for which the eye has low acuity its bandwidth is only approximately 1 mc. or ½ mc. on each side of the color subcarrier. As can be seen by comparing FIGURE 2*b* and FIGURE 2*a*, were the Q signal to be transmitted double sideband such that it contained higher modulating frequencies than 0.5 mc. the upper edge of the Q channel 23 would then be located outside of the luminance channel and picture transmission band. Since the eye has low acuity for the information transmitted by the Q signal it has been found satisfactory to limit the Q information to the Q channel 23 as shown.

Figures 2C, 4A:
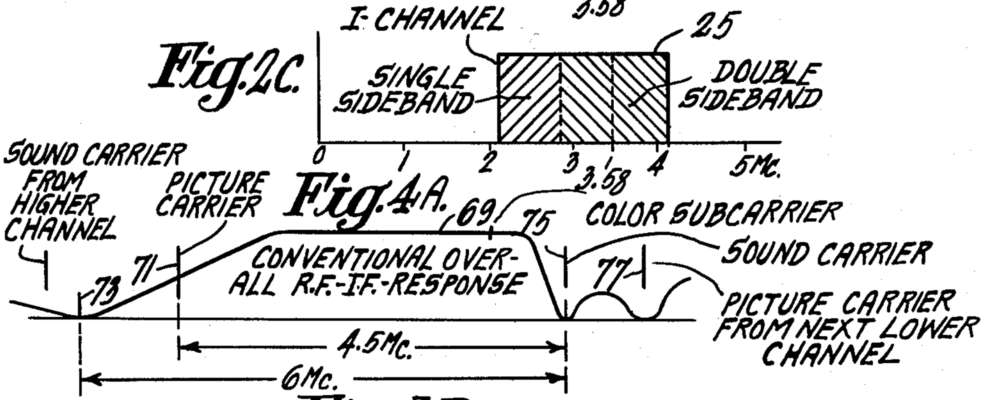

The I signal contains information pertaining to colors for which the eye has fairly high acuity. Since the I channel 25 cannot be permitted to extend beyond the upper range of the picture channel, namely in the vicinity of 4½ mc., the I signal is transmitted double sideband for I components of up to ½ mc. and as shown in FIGURE 2*c* the use of single sideband transmission is included for those I signal components above approximately ½ mc. It is to be noted, of course, that the I channel 25 and the Q channel 23 take place in the upper spectrum region of the luminance channel 21. In order that the color information, as contained on the color subcarrier, does not interfere with the information provided by the luminance channel, it has been found convenient to specify the frequency of the color subcarrier at an odd multiple of one-half the line frequency, the value of 3.579545 mc. having been adopted. Since a color television image spectrum is known to be described by groups of side frequencies separated by gaps having little spectral information, the adoption of the color subcarrier frequency at a frequency which is an odd multiple of ½ the one frequency causes the color information spectra to be substantially located in the gaps of the luminance information spectrum therefore minimizing the cross talk and the spectrum confusion which would otherwise occur.

Figures 3, 5A, 5B:
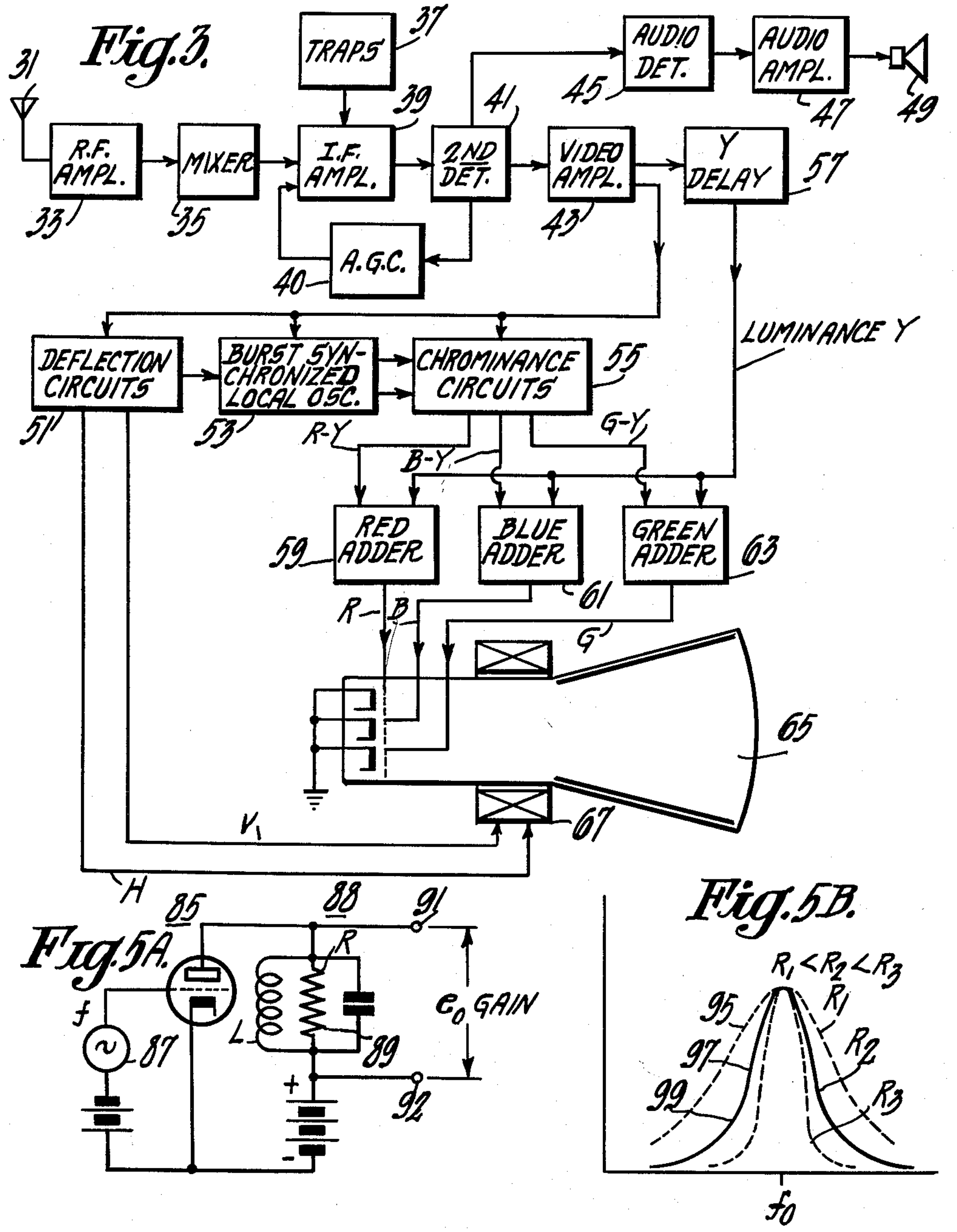

Consider now the overall aspects of a color television receiver which is utilized to receive the transmitted color television image having sound, luminance information, synchronizing information and chrominance information; the recovered color image to be reproduced on a color image reproducer. As is shown in FIGURE 3 the transmitted color television signal arrives at the antenna 31 and is passed through the RF amplifier 33 into the mixer 35. In the mixer the color television information is heterodyned down to an intermediate frequency from which point it is then passed through the intermediate amplifier 39. The intermediate frequency amplifier 39 is equipped with traps 37 which trap out adjacent channel information and attenuate the cochannel sound. After being subjected to intermediate frequency amplification, the recovered television image is then detected by the second detector 41 which in modern color television receivers provides or aids in the provision of an automatic gain control signal which activates the AGC circuit 40 which produces automatic gain control in the IF amplifier 39.

Normally, in color television receivers, the audio signal information is separated from the color television signal in some early stage of intermediate frequency amplifier 39, usually before the final sound carrier traps.

One of the important advantages of this invention is the economy resulting from the method of handling the sound information. In order to avoid undesired beats in the picture, the sound carrier is attenuated very greatly in the IF of a conventional color receiver. In fact the necessary attenuation is so great that the sound cannot be recovered in the usual intercarrier manner and a separate sound second detector is required. A receiver constructed after the teachings of this invention does not attenuate the sound as much as the conventional set and therefore the same second detector that is used for the video can be used for the sound. Undesired beats are not produced with this improved method since both the color subcarrier and the sound carrier are attenuated.

Aside from the sound information which is transmitted to the sound channels as described, the picture output of the video amplifier contains the picture synchronizing information, the monochrome information, the chrominance information, and the chrominance synchronizing information. The color television signal is then applied to four channels, the first is the deflection circuit channel consisting of the deflection circuits 51 which provide the vertical and horizontal deflection signals to the yokes 67 of the color kinescope 65. The composite color television signal is also impressed on the burst synchronizing local oscillator 53 which ultizes a keying signal or gating signal from the deflection circuits 51 to gate the burst from the remainder of the color television signal, the gated burst then being utilized using suitable synchronizing circuits to synchronize the local oscillator.

The composite color television signal is also applied to the chrominance circuits 55 which select the chrominance portion of the video spectrum, and receiving suitable local oscillator voltages from the burst synchronized local oscillator 53, recover the I and Q signals by the processes of synchronous detection and apply these I and Q signals through suitable filters into matrix and inverter circuits which yield the recovered color difference signals, namely the $R-Y$, the $B-Y$, and the $G-Y$ signals.

At the same time the complete color television signal is sent through a delay line 57 where this signal which includes the luminance signal information Y is impressed simultaneously on the red adder 59, the blue adder 61, and the green adder 63 to which adders are supplied the respective color difference signals to yield the recovered red, green, and blue signals which are applied to appropriate control grids of the color kinescope 65.

The present invention is concerned primarily with the IF amplifier 39 and the video amplifier 43 in the color television circuit of FIGURE 3, when considered in view of its applicaion to color television receiver techniques. It will be apparent to those skilled in the art that many of the aspects that will be discussed in the specifications to follow—those aspects related to the complexities and details of color television image reception—will have considerable application in other types of receivers and instruments.

Heretofore it has been conventional to use an overall RF-IF response characteristic of the type shown in FIGURE 4*a*. Here one low response region is located at substantially the frequency 73 to exclude the sound carrier from the higher channel with a second low response region at the frequency 77 to exclude the picture carrier from the next lower channel. Another low response region is introduced at the frequency 75 of the sound carrier. In the vicinity of the picture carrier frequency 71 the response is sloped as shown. Since the transmission utilizes vestigial sideband transmission, it is necessary to utilize a response in the vicinity of the carrier as shown whereby the components on one side of the picture carrier are given increased amplitude as compared to the components on the other side of the carrier so that the picture components in the vicinity of the picture carrier will not have undue lower frequency accentuation.

Figure 4B:
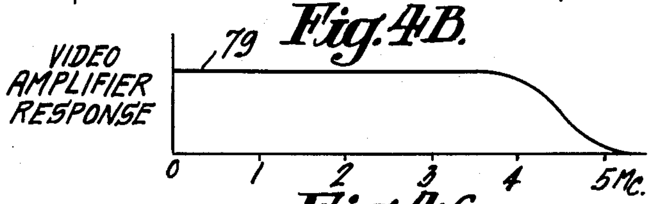
Figure 4C:
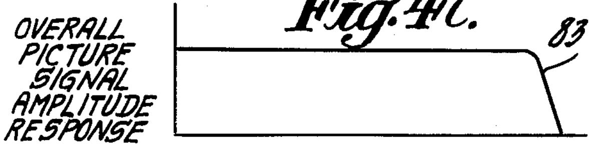

To match the conventional overall RF-IF characteristics shown in FIGURE 4*a* a video amplifier response substantially that shown in FIGURE 4*b* is required where the video amplifier response curve 79 is substantially flat up to around 4.2 mc., sometimes with a sound trap located at 4.5 mc., the frequency of the sound carrier. The overall picture signal amplitude response is then substantially flat as shown by the curve 83 in FIGURE 4*c*.

The desirability for having the sound carrier attenuated in the IF to a level at least 44 db below that of the midband region is discussed in detail by John E. Allen in the report of the Professional Group on Broadcasting Receivers of the Institute of Radio Engineers for January 1954.

Numerous disadvantages are attendant with the use of a conventional overall RF-IF response curve of the type shown in FIGURE 4*a* which is matched with the video amplifier response curve 79 shown in FIGURE 4*b*. As has been previously pointed out it is desirable that the overall pass band be as wide as possible to insure minimum phase and amplitude distortion at the upper video modulation frequency edge of the band. To meet this requirement while at the same time attenuating the sound to a satisfactory low level, the conventional receiver uses very critical high Q traps. The present invention, therefore, relates to characteristic RF-IF response curves and complementary video amplifier response curves which have a great number of advantages to be described.

Before considering the various embodiments which represent the genus and species of the present invention it is instructive to turn first to an important method of approach for shaping the RF-IF response characteristic. Consider first the elementary amplifier circuit shown in FIGURE 5*a*, which utilizes a tuned circuit as its plate load, this tuned circuit tuned to the frequency $f_0$. The tuned circuit includes the resistance R–89 upon whose value the Q of the resonant circuit depends. The gain of such an amplifier can be described as $$g=G_m R\frac{a}{a+j\left[\left(\frac{f}{f_0}\right)^2-\left(\frac{f_0}{f}\right)^2\right]} \quad (1)$$

where $$a=\frac{1}{R}\sqrt{\frac{L}{C}} \quad (2)$$

$$f_0=\frac{1}{2\pi\sqrt{LC}} \quad (3)$$

The salient gain characteristics as illustrated by Equation 1 are shown in FIGURE 5*b* where it is seen that the gain versus frequency curve is peaked at the resonant frequency $f_0$ with the width and shape of the gain versus frequency curve a function of the value of the resistor R and therefore a function of the Q of the resonant circuit.

Figure 6:
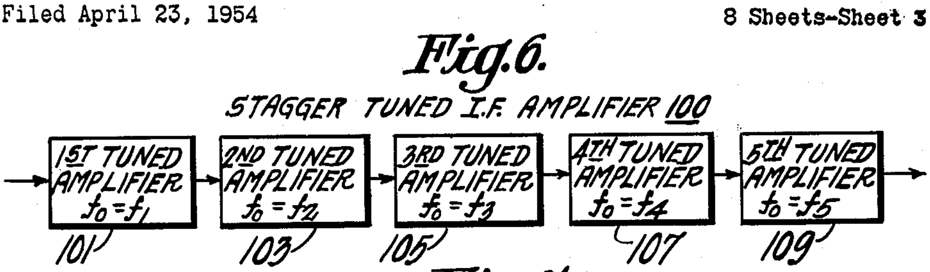
FIGURE 6 shows an IF amplifier.

A group of amplifiers of the type 85 shown in FIGURE 5*a* may then be connected in cascade to form the staggered tuned IF amplifier 100 shown in FIGURE 6 where the first tuned amplifier 101 has a resonant circuit tuned to the frequency $f_1$, with the second tuned amplifier 103, the third tuned amplifier 105, the fourth tuned amplifier 107, and the fifth tuned amplifier 109 having resonant circuit tuned to the frequencies $f_2$, $f_3$, $f_4$, and $f_5$ respectively. The effect of stagger tuning with the frequencies indicated is shown in FIGURE 7 yield an IF characteristic similar to that shown in FIGURE 4*a* as illustrated.

Figure 7:
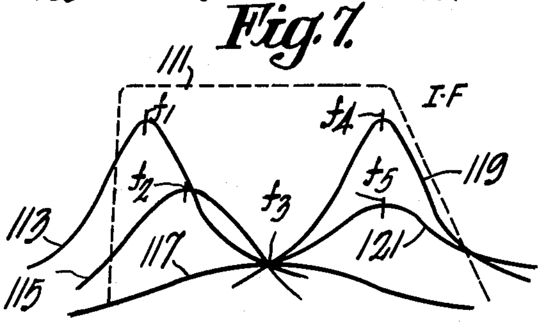
FIGURE 7 shows how variation in the resonant frequency and gain characteristics of each of the amplifier sections of the staggered tuned amplifier in FIGURE 6 can be matched to give a desired transmission band characteristic.

Note that the characteristic 111 in FIGURE 7, which is the IF characteristic, is reversed as compared to the conventional RF-IF characteristic 69 shown in FIGURE 4*a*. This reversal follows from the processes of mixing; in order to avoid any confusion, the discussion henceforth will center about RF-IF response characteristics rather than IF characteristics so that the RF-IF characteristics may be compared directly to the corresponding video amplifier characteristics in order that the present invention may be more clearly illustrated.

Before entering upon considerations of the present invention, consider at this point another aspect of the superheterodyne receiver performance which is concerned with cross modulation and distortion and which yields an important basic concept. Cross modulation will mean the production of spurious new signals from interaction within the receiver circuits of the brightness, color and sound information. In a single or vestigial sideband system, the amplitude of the envelope does not accurately represent the sum of the carrier modulation components. Therefore the output of a linear second detector which follows the envelope may contain distortion and cross-modulation products. In general the amplitude of the useful output of a particular component depends upon the product of the carrier and the particular component being considered. The lowest order of cross-modulation products which are produced in linear and square law detectors depends upon the product of the amplitudes of the two interfering sidebands. The linear detector also provides many higher order distortions of decreasing amplitude involving various combinations of the signal components.

The useful outputs from either a linear or a square law detector may be increased relative to the cross-modulation outputs by raising the carrier level (exalted carrier), or by decreasing the side frequency levels. A given cross-modulation output may be reduced by reducing one or both of the side frequencies involved. When using exalted carrier operation, still further reduction of cross-modulation, can also be obtained by using a balanced detector.

As is well known in the art, cross-modulation and distortion can also occur in the amplifier or mixer circuits ahead of the second detector. In general, the amplitudes of the distortions and undesired frequencies are proportional to at least a cube of the composite signal level. Therefore they are more serious at high level stages or when receiving strong signals. However, the amplitude of the cross-modulation products may be decreased by lowering the side frequency amplitudes but not by raising the carrier, so there is some difference between IF amplifiers and second detectors on this score.

One of the more serious cross-modulation products in a color television receiver is the 920 kilocycle beat between the color subcarrier and the sound carrier. Analysis and experiment have indicated that a combined attenuation of color and sound carriers of up to 44 decibels is required to keep this beat invisible.

Cross-modulation between a brightness signal component and the sound carrier may also be serious. It can appear as color interference if it happens to fall in the vicinity of the frequency of the color subcarrier; in fact this type of cross-modulation can be even more serious than the 920 kilocycle beat thereby requiring that at least some sound trapping be instituted in the intermediate frequency amplifier utilized in the present invention.

In most black-and-white television receivers, for cost and other reasons, the bandwidth of flat overall response has been about 3.6 mc. or less. This leaves in the neighborhood of 1 mc. between the edge of the video spectrum and the sound spectrum thereby making it possible to more easily attenuate the co-channel sound. In color receivers on the other hand, flat overall response up to 4.2 mc. is desirable leaving only 0.3 of a megacycle in which the co-channel sound is to be attenuated. Furthermore good color response requires more careful elimination of interferences resulting from the sound signal than is usual for black-and-white receivers.

Color television receivers with IF-amplifier flat response substantially to 4.2 mc. bandwidth and sound attenuation upwards of a thousand times, have been built which produce excellent pictures. The IF amplifiers of such receivers are costly however; they have more stages, more adjustments, and closer tolerance components than black-and-white receivers; also, separate sound takeoff and detection are needed. The performance of such receivers, good in other respects, is critical to fine tuning or drift of the heterodyne oscillator. Small errors in fine tuning therefore result in beat between the sound and picture and an increased quadrature distortion on color edges.

The preceding paragraphs have pointed out the desirability of having enhanced carrier operation in order to reduce cross-modulation in superheterodyne reception. The desirability of eliminating such beats as that which exists between the color subcarrier and the sound carrier also was described. In FIGURE 4*a* the conventional overall RF-IF response curve 69 was seen to be substantially flat over the entire video range with the decrease in the vicinity of the picture carrier 71 designed to yield suitable low modulation frequency response. Consider now one form of the present invention in which the entire video bandwidth may be compensated; for wide band color receivers the IF amplifier response may have no flat section at all, hence the description, round top IF. If the IF amplifier is to have no flat section, then, of course, video amplifier compensation must be instituted to match the IF characteristic in order to produce a flat overall response.

One form of a round top IF-RF response characteristic is that shown in FIGURE 8*a* where it is seen that the characteristic curve 127 reaches a maximum value shortly to the right of the picture carrier 126 and then decreases in amplitude gradually to a point in the vicinity of the sound carrier 128. This round top RF-IF response characteristic may be matched by the complementary video response characteristic 129 to give the desired flat overall IF video response curve 131. Note that a trap for the sound carrier has been instituted at 4.5 mc. in the video response characteristic in FIGURE 8*b*.

The complementary response characteristics shown in FIGURE 8*a* and FIGURE 8*b* present solutions to several of the problems which have been previously discussed in the specifications. The gradual decrease with increasing picture frequency in RF-IF response without a corresponding decrease of level decreases the amount of distortion which might be inherent in the RF-IF amplifier stages. Note that the sound trap has been instituted in the video amplifier. The use of the round top RF-IF response characteristic therefore shifts the critical part of the selectivity problem from the intermediate frequency amplifier to the video portion of the receiver thereby leading to many performance advantages. This approach simplifies the problem of sound attenuation since the signal components in the vicinity of the color subcarrier, as yielded by the RF-IF response characteristic 125 are at a reduced level with the level of the sound carrier still subtsantially lower than that of the color subcarrier.

FIGURE 9 shows a circuit which can be utilized to yield the IF response necessary to correspond to the RF-IF response characteristic curve 127 shown in FIGURE 8*a*, assuming that the RF stages give substantially flat response to the particular signal frequencies involved. This round topped IF response characteristic is achieved in the IF amplifier 141 in FIGURE 9 by the use of three stages as shown; these three stages having a series of plate and grid resonant circuits. The correct IF response characteristic can be then attained by proper choice of the Q's and resonant frequencies of the resonant circuits 149, 150, 151, 155 and 159. The output of the IF amplifier, whose resonant circuits have been adjusted to give the IF response characteristic curve 127 shown in FIGURE 8 utilizing the principles discussed in connection with FIGURE 7, may then be passed through the detector circuit 160 and thence to the 4.5 mc. sound trap 169. Note that the output of the second detector 160 is also applied to the automatic gain control circuit or AGC 143 where in the automatic gain control detector 161 the signal level is established and applied to the AGC amplifier 163 which yields a voltage at the terminal 165 which controls the bias and therefore the gain of the first IF stage 148 and the second IF stage 153 in a conventional manner. The output of the second detector 160 having been passed through the 4.5 mc. trap 169 is then applied to the video amplifier 145. The first stage of the video amplifier 145 is the cathode follower circuit 171 which applies its output voltage from the cathode terminal 170 through the second sound trap 172 to the control grid of the second video amplifier tube 174 in the second video stage 175. The output circuit of the second video stage 175 includes the condenser 177, the inductor 173 and the resistor 176. By proper choice of the magnitudes of these three components the frequency response of the second video stage 175 may be peaked to yield the video response characteristic 129 which is seen to increase with frequency in a manner which complements the IF response characteristic curve 127 so as to give the flat overall IF video response curve 131. The combined action of the sound traps 169 and 172 serve to yield the trapping indicated at the sound carrier 130 in FIGURE 8*b*. The output of the second video amplifier stage 175 is then impressed on the input to the third amplifier stage 179 which yields a final video output at the output terminal 180 from which point the recovered color television information may be relayed to the various luminance, synchronizing, and color channels of the color television receiver.

There are numerous locations in the circuit diagram in FIGURE 9 from which the sound information may be obtained. In the circuit shown the sound information is obtained from a cathode follower stage 158 which amplifies the output of the second detector 160 prior to the passing of the detected signal through the 4.5 mc. sound trap 169. This amplified video signal may then be applied to a detector of the type used for intercarrier sound from which the recovered audio information may be passed through an audio amplifier to a loud speaker as is described in connection with the circuit shown in FIGURE 3.

The round topped RF-IF response characteristic 125 in FIGURE 8*a* and its complementary video response characteristic 129 in FIGURE 8*b* show one method of approach which has the advantage of the increased carrier amplitude in the RF-IF amplifier region and which permits the shifting of much of the selectivity and trapping problem from the IF to the video portion of the receiver.

It is well known in mathematics that any simple type of curve may be described by a power series of the Taylor series type. It is known, for example, as is shown in chapter 7 of "Harmonics, Sidebands and Transients in Communication Engineering," by C. Louis Cuccia, that in order to represent characteristic curves, a series of terms, namely straight line, square law curve, cubic parabola, etc. may be used, all having amplitudes dictated by the characteristic represented. By adding these particular curves together it is possible to produce the desired characteristic curve. The basic concepts illustrated in the Taylor series approach as applied to complementary matching may be illustrated graphically by the following:

In one of its simpler forms, the Taylor series yields the power series $$f(t)=c_0+c_1f+c_2f^2+c_3f^3+ \dots \quad (4)$$

where the $c$'s are constants. The term $c_0$ yields the constant term, $c_1f$ yields the straight line or linear first correction term, $c_2f_2$ yields the parabolic curve second correction term, etc.

Inspection of the power series as given by Equation 4 which includes linear, parabolic and cubic parabola terms leads to the considerations of the possibility of using exponentially or logarithmically varying RF-IF response characteristic curve in conjunction with a logarithmically varying complementary video response characteristic curve.

Consider the case when an IF and video complementary response is desired with each varying logarithmically with respect to frequency according to the following relationship, $$g_{if}=e^{G_i}-kf \quad (5)$$

$$g_v=e^{G_v}+kf \quad (6)$$

where $g_{if}$ and $g_v$ describe the gain of the intermediate frequency and video amplifiers respectively and where $G_i$ and $G_v$ are gain constants relating to the IF and the video response, $k$ is a constant governing the magnitude of the exponent and $f$ is the video modulation frequency. Note that these equations can be written in the form $$\log g_{if}=G_i-kf \quad (7)$$

$$\log g_v=G_v+kf \quad (8)$$

Now let a small change in tuning be effected whereby $f$ in Equation 7 may be replaced by $f+\Delta f$; Equations 7 and 8 then become $$\log g_{if}=G_i-kf-k\Delta f \quad (9)$$

$$\log g_v=G_v+kf \quad (10)$$

If the specification is made that the combined IF and video amplifier yield again independent of video modulating frequency, then they may be equated to a parameter X which may vary with fine tuning but not with video modulation frequency; it follows that $$\log g_{if}+\log g_v=X=G_i+G_v-k\Delta f \quad (11)$$

and it is seen that the frequency dependent terms have cancelled showing the relative insensitivity to tuning of the complementary exponential response of the IF-video system having characteristics described by Equations 5 and 6.

Before proceeding with the discussion of the complementary logarithmic or exponential response curves as described by Equations 5 and 6 consider first some aspects of color television receiver design which bear upon the adoption of RF-IF and video characteristic curves of unusual and specific shape. The minimizing of fine tuning distortion is more desirable for the chrominance information than for the luminance information. It therefore follows that one approach to engineering design of a color television receiver utilizing complementary logarithmic RF-IF and video amplifier matching is to employ two video amplifiers—one for the luminance information and one for the chrominance information. A block diagram of a color television receiver employing this approach is shown in FIG. 10 where the circuit is identical to that in FIG. 3 in all details except that the luminance video amplifier 185 is used to supply luminance information to the luminance channels through the delay 57 and the chrominance video amplifier 183 is used to supply the chrominance video information to the chrominance circuits 55. The response characteristics of the luminance video amplifier 185 may then be designed for optimum utilization of the luminance information and the response of the chrominance video amplifier 183 may be designed to produce a complementary logarithmic RF-IF and video response system to derive the various benefits arising from the use of the present invention.

For the design parameters essential in considerations in the design of video amplifiers having logarithmic gain versus frequency response, note from Equation 6 that the gain of the video amplifier may be described in the following manner:

$$g_v = e^{G_v} + kf \quad (12)$$
$$= e^{G_v} e^{kf} \quad (13)$$
$$= M e^{kf} \quad (14)$$

where M is a constant depending upon the value of $G_v$. Then it follows that $$\frac{g_v}{M} = e^{kf} \quad (14)$$

$$= 1 + kf + \frac{(kf)^2}{2!} + \frac{(kf)^3}{3!} + \frac{(kf)^4}{4!} + \dots \quad (15)$$

$$= 1 + kf + \frac{(kf)^2}{2!} + \frac{(kf)^3}{3!} \quad (16)$$

since it can be shown that for logarithmic curves of the type useful in the present invention, terms higher than the power of cube do not contribute to the solution in a significant manner.

Consider then the validity of a representative approximate calculation for the case when there is required an increase in response of 3 db per megacycle in the video amplifier; let the gain be expressed in the approximate form $$g_{v(f)} = g_0 + g_1 f + g_2 f^2 \quad (17)$$

For the gain to be 100% at 4.5 mc., then M in Equation 16 must equal 0.265. For 3 db/mc., $k=0.3465$; it follows then from Equation 17 that at $f=0$, $$g_0 = 21.3\% \quad (18)$$

At representative points such as $f=1.2$ mc. and $f=3.6$ mc., the exponential representation for gain as given by (14) yields $$g_v(1.2) = 32\% \quad (19)$$
$$g_v(3.6) = 73.7\% \quad (20)$$

which when substituted into Equation 17 to yield two simultaneous equations, give $$g_1 = 5.95 \quad (21)$$
$$g_2 = 2.47 \quad (22)$$

which gives finally $$g_v(f) = 21.3 + 5.95f + 2.47f^2 \quad (23)$$

This gives an excellent approximation of the logarithmic response curve which is described by the entire exponential series as given by Equation 15.

Figure 11 shows representative response curves which involve the complementary matching of logarithmic RF-IF and video characteristic response curves. In Figure 11 is shown the RF-IF response 211 which starts its logarithmic shape in the vicinity of the picture carrier frequency 219 with the logarithmic curve continuing to beyond the frequency of the sound carrier 221. The video response curve 213 starts its logarithmic characteristic at the lower modulating frequencies and continues this logarithmic characteristic to the vicinity of the sound carrier 221 where a properly connected trap will create the trap characteristic 215 so as to effectively eliminate the sound carrier from the picture signal itself.

One aspect of the performance of a logarithmic matching RF-IF and video response system is shown in FIGURE 12 where FIGURES 12*a* and 12*b* show the standard color receiver selectivity curves for both the RF-IF and the video circuits respectively. The RF-IF curve 214 and the video response curve 216 are seen to yield substantially flat overall response curves. Should the color receiver having the characteristics shown in FIGURE 12*a* and FIGURE 12*b* be detuned, then the change in bandwidth as illustrated in FIGURE 12*c* will take place with the bandwidth changing between the limits as shown by the dotted lines 220 and 222 respectively. However, when the color receiver having the logarithmic RF-IF and video response system is detuned, the effect is that shown in FIGURE 12*f*. As a result of the form of the logarithmic RF-IF curve 225 and the logarithmic video response curve 227 shown in FIGURES 12*e* and 12*d* respectively, the results of fine detuning will be one of change of amplitude between the limits as shown by the dotted lines 230 and 231 respectively. Note that the bandwidth of the signal is not affected.

For color receivers it is also very important to have certain prescribed amplitude and phase characteristics in the higher frequency cut-off region of the RF–IF characteristic. In order to minimize crosstalk between the two phases of modulation in the color subcarrier and to help achieve these prescribed amplitude and phase characteristics, a system of phase preamplification and equalization is employed in the transmitter; it is also important that the color receiver match these amplitude and phase characteristics to as great a degree as possible. In a conventional color receiver, such matching is very dependent upon the fine tuning; in a color receiver using the present invention the matching is relatively independent of the fine tuning.

The need to have the proper amplitude and phase characteristics in the higher frequency cut off region of the RF-IF characteristics may be further illustrated by considering some basic aspects of the color subcarrier. The color subcarrier is quadrature modulated by a pair of color signals. In order to reduce crosstalk between these color signals which represent vectors of prescribed phases in the overall vector composition of the quadrature modulated color subcarrier, it is important that one or more of the component vectors involved does not become attenuated to any degree since this would cause quadrature vector components to appear resulting in some I signal crosstalk appearing in the Q signal and some Q signal crosstalk appearing in the I signal. It therefore clearly follows that in any color television receiver which is to yield optimum color information reception with a minimum of cross-talk, it is necessary that the vectorial composition of the quadrature modulated color subcarrier be effected to as slight a degree as possible.

Having thus proven the validity and the usefulness of the logarithmic matching round top RF-IF response characteristic curves when used in conjunction with a complementary matching logarithmic video response characteristic curve for yielding substantially flat output response up to the desired frequency, let us consider now the design of a circuit which performs in accordance with these principles.

A typical circuit is shown in FIGURE 13 where a logarithmic response IF amplifier 250 is operated in conjunction with the second detector 263, the sound carrier filter 265 and the logarithmic frequency response video amplifier 266. Consider first the IF amplifier. This amplifier receiving an IF signal at the input terminals 252, yields IF amplification in the stages 251, 255, and 259 respectively. The first IF amplifier stage 251 has for its load impedance the resonant load circuit 253 tuned at frequency $f_1$. The second IF amplifier 255 has for its resonant load impedance, the resonant circuit 257 which has a resonant frequency at $f_2$. The third IF amplifier 259 has for its load circuit, the resonant load circuit 261 which is tuned to the frequency $f_3$. By proper choice of $f_1$, $f_2$ and $f_3$ and also of the Q's of the respective resonant circuits the logarithmic RF-IF response characteristic 301 shown in FIGURE 14*a* may be evolved.

By installing the sound carrier trap 254 at the input to the IF amplifier 250 the trapping action 306 as shown in FIGURE 14*a* may be accomplished.

Consider now the operation of the logarithmic frequency response video amplifier 266 shown in FIGURE 13. It is desired that this video amplifier have the logarithmic gain versus frequency curve 308 shown in FIGURE 14*b*, this logarithmic curve being complementary to the logarithmic RF-IF response characteristic 301 shown in FIGURE 14*a*. There are several methods by which a video amplifier with logarithmic frequency response may be constructed. One approach which follows readily in connection with Equation 17 is the logarithmic frequency response video amplifier 266 illustrated in FIGURE 13, in which appropriate amounts of video information conforming to the various powers of the frequency are added together.

The output of the sound carrier filter 265 impresses a sound-carrier-filtered recovered video signal at the terminal 264 which is the input to the video amplifier 267. The video signal is passed through the first amplifier stage 267 whose output is then passed through a second amplifier output stage 269 and applied to the output terminal 271. The output of these two amplifier stages 267 and 269 follows a constant gain characteristic as described by the first term in Equation 18.

The second term of the exponential series is proportional to the frequency $f$. The design of an amplifier having an output gain versus frequency curve which varies linearly with respect to frequency is a relatively simple matter. It is well known that the reactance of an inductance is simply $2\pi fL$ where L is the inductance. Since the gain of any amplifier is a function directly of its load impedance, then the utilization of an inductance coil as a load impedance will provide amplifier action which will yield a gain versus frequency curve which increases linearly with respect to frequency. The amplifier circuit 273 is such an amplifier having the inductance 281 as its load impedance. The output of this amplifier 273 which conforms to the second term of Equation 18 is then passed through the amplifier 275 which adds the so-called second term to the output of the video amplifier; this second term being a function of $kf$ with $k$ a constant. The third term of Equation 18 is $k^2f^2/2$. This term is essentially the second term squared and divided by 2. This can be accomplished by applying the second term to each of two grids of a vacuum tube, multiplying the signals representing these terms together and then adjusting the gain to obtain the ½ factor. This is accomplished in the pentode tube 279 with the second term produced by the amplifier circuit 273 fed simultaneously to the grids 277 and 278. The output of the pentagrid converter tube 279 then yields the third term which is added to the signals already impressed at the output terminal 271.

The fourth term, which involves the third power of the frequency as expressed by the term $k^3f^3/6$ in Equation 18, is obtained by multiplying together the second and third terms and adjusting the gain for the term. As is shown in connection with the amplifier circuit 280 which receives the second term signal from the amplifier 273, this signal being impressed on the grid 285 with the third term signal from the cathode resistor 268 of the third amplifier 279, impressed on the suppressor grid 283. With the gains of each of the various amplifiers of the logarithmic response video amplifier 266 properly adjusted, the signal appearing at the output terminal is a very excellent approximation of an exact logarithmic frequency response.

A simplified logarithmic response video amplifier 314 is shown in FIGURE 15 where it is seen that the video signal is applied to the input terminal 315 which delivers its signal to the control grid 316 of the first tube 319. The screen grid 318 supplies the constant term. The plate circuit of the first tube 319 having an inductive load impedance will then supply the second term. By properly impressing both the first term and the second term on the respective grids of the pentagrid converter tube 325 with the constant term fed to the control grid 331 and the second term fed to the third and fifth grids 327 and 329 respectively, simultaneous addition and multiplication takes place within the pentagrid converter 325. The logarithmic output will then appear across the cathode resistor 324. Since the constant factors which are associated with each of the series terms of the exponential series are of importance in yielding logarithmic response, consideration must be given to the precise values of the grid bias voltages applied to terminals 320 and 322.

In applications of the present invention to low-cost narrow bandwidth receivers, an attractive hybrid IF arrangement is possible. As is shown in FIGURE 16 the RF-IF frequency response may be made to slope off in the vicinity of the subcarrier 353; with the logarithmic variations starting in the vicinity of 2½ mc., and the RF-IF response characteristic substantially flat topped up to this point. In order to properly match this RF-IF response characteristic the chrominance video amplifier is provided with a complementary logarithmic response in the vicinity of the color subcarrier 353 as shown in FIGURE 16 to yield proper frequency response throughout the spectrum range of the chrominance portion of the color television signal. By use of this approach the overall frequency response in the color subcarrier region remains flat independent of fine tuner adjustment and the luminance video amplifier actually need not be amplitude-response compensated at all. This particular approach to complementary logarithmic RF-IF and video amplifier response provides an excellent means for producing color television receivers of improved performance but at reduced cost.

One aspect of the present invention must be noted, particularly in consideration of the schematic diagrams which have been presented in FIGURES 9 and 13. Since the response at higher video frequencies is less in a complementary round top RF-IF video response system, than in a superheterodyne response system it is possible to achieve higher intermediate frequency gains utilizing less complicated intermediate frequency amplifier circuits. The video amplifier in order to be adapted for complementary response matching undergoes a minimum of an increase in circuit complexity and provides an ideal location for the sound carrier trap, thereby yielding a reduction in overall IF-video amplifier system cost as derived directly from employment of the present invention.

The various embodiments of the present invention, as described thus far, have involved an RF-IF response characteristic wherein the logarithm of the gain increases linearly with respect to frequency. In applications where cross modulation distortion is not important but off-tuning distortion is to be minimized, it follows that logarithm of the attenuation of the intermediate frequency amplifier may be permitted to decrease linearly in a prescribed region to be matched by a corresponding linear decrease in the logarithm of the gain of the video amplifier in that prescribed region.

Having thus described the invention, what is claimed is:

1. In a signalling system including a modulated signal channel having a transmission band adapted for the transmission of a carrier modulated by a modulating wave having modulating frequencies and having a prescribed bandwidth, said modulated signal channel having a transmission bandwidth suitable for the transmission of said modulating wave, a modulating wave detector, and a demodulated signal amplifier, said demodulated signal amplifier having a bandwidth commensurate with said prescribed bandwidth corresponding to said modulating wave, means for causing the logarithm of the gain of said modulated signal channel to decrease substantially linearly with respect to the modulating frequency over a predetermined portion of said prescribed bandwidth, and means for causing the logarithm of the gain of said demodulated signal amplifier to increase substantially linearly with respect to modulating frequency over said predetermined portion of said prescribed bandwidth.

2. In a signalling system including a modulated signal channel having a transmission band adapted for the transmission of a carrier modulated by a modulating wave having modulating frequencies having a prescribed bandwidth, said modulated signal channel having a transmission bandwidth suitable for the transmission of said modulating wave, a modulation signal detector, means for providing said modulated signal channel with a frequency response characteristic such that for a first predetermined portion of said prescribed bandwidth corresponding to lower modulating frequencies the gain of said modulated signal channel is substantially nonlogarithmic with respect to modulating frequency, and wherein for a second predetermined portion of said prescribed bandwidth corresponding to higher modulating frequencies the logarithm of the gain of said modulated signal channel decreases substantially linearly with respect to modulating frequency, and a first demodulated signal amplifier, a second demodulated signal amplifier, said second demodulated signal amplifier having a bandwidth commensurate with said second predetermined portion of said prescribed bandwidth, means for causing the gain of said second demodulated signal amplifier to vary with frequency such as to compensate for the variations in attenuation of said modulated signal channel with frequency over said second predetermined portion of said prescribed bandwidth.

3. In a television receiver adapted for the reception of television signals having a prescribed bandwidth and transmitted on a vestigial sideband modulated carrier, said television receiver including at least a first detector, an intermediate frequency amplifier, a second detector, and at least a video amplifier channel, said intermediate frequency amplifier having a bandwidth commensurate with that prescribed for said television signals transmitted on a vestigal sideband modulated carrier, said television receiver characterized by a prescribed tuning of said first detector to properly situate said television signals on said vestigial sideband modulated carrier in said bandwidth of said intermediate frequency amplifier, means for minimizing fine tuning distortion arising from deviations in said prescribed tuning of said first detector comprising in combination, means for causing the logarithm of the gain of said video amplifier channel to increase substantially linearly with respect to said modulating frequency, and means for causing the gain of said intermediate frequency amplifier to vary with frequency such as to compensate for the gain variations with freqeuncy of said video amplifier channel.

4. In a color television receiver adapted for the reception of color television signals having a prescribed bandwidth and transmitted on a vestigial sideband modulated carrier, said television signals including luminance information, a suppressed carrier quadrature modulated color subcarrier and a sound modulated carrier, the combination of a first detector, an intermediate frequency amplifier, a second detector, and at least one video amplifier channel, means for providing said intermediate frequency amplifier with a frequency response characteristic which is curvilinear over a portion of the intermediate frequency amplifier's passband occupied by said color subcarrier and sidebands thereof, the response of said intermediate frequency amplifier throughout at least a major segment of said curvilinear characteristic portion being less than the response of said intermediate frequency amplifier to the vestigial sideband modulated carrier, and decreasing with increase in frequency departure from said vestigial sideband modulated carrier intermediate frequency, and means for providing said video amplifier with a frequency response characteristic which is curvilinear over a portion of the video amplifier's passband occupied by said color subcarrier and sidebands thereof, the response of said video amplifier increasing with frequency throughout said curvilinear characteristic portion.

5. Apparatus in accordance with claim 4 wherein said curvilinear portion of the frequency response characteristic of said intermediate frequency amplifier is shaped so that the logarithm of the gain of said intermediate frequency amplifier varies substantially linearly with frequency over said characteristic portion, and wherein said curvilinear portion of the frequency response characteristic of said video amplifier is shaped so that the logarithm of the gain of said video amplifier varies substantially linearly with frequency over said characteristic portion in a manner effectively complementary to the variation of the logarithm of the intermediate frequency amplifier gain.

6. In a color television receiver including a source of color television intermediate frequency signals falling within a predetermined band of intermediate frequencies, and including a picture carrier modulated with both luminance information and chrominance information, and an accompanying sound modulated carrier, said chrominance information appearing as a modulated color subcarrier with the color subcarrier and its sidebands occuping a portion of said predetermined band closely adjacent to said sound modulated carrier and remote from said picture carrier; the combination comprising an intermediate frequency amplifier coupled to said source, detecting means responsive to the output of said intermediate frequency amplifier for demodulating said picture carrier, a video amplifier, means for applying the demodulated output of said detecting means to said video amplifier, chrominance information utilization means responsive to the output of said video amplifier, and means for minimizing the effects of receiver mistuning on said chrominance signal utilization means, said minimizing means comprising means for causing said intermediate frequency amplifier to exhibit a frequency response characteristic which is curvilinear over a portion of the intermediate frequency amplifier's passband occupied by said color subcarrier and sidebands thereof, the response of said intermediate frequency amplifier throughout at least a major segment of said curvilinear characteristic portion being less than the response of said intermediate frequency amplifier to the vestigial sideband modulated carrier, and decreasing with increase in frequency departure from said vestigial sideband modulated carrier intermediate frequency, and means for causing said video amplifier to exhibit a frequency response characteristic which is curvilinear over a portion of the video amplifier's passband occupied by said color subcarrier and sidebands thereof, the response of said video amplifier increasing with frequency throughout said curvilinear characteristic portion.

7. Apparatus in accordance with claim 6 wherein said curvilinear portion of the intermediate frequency amplifier's response characteristic establishes a logarithmic variation of intermediate frequency amplifier gain with frequency over said characteristic portion, and wherein said curvilinear portion of said video amplifier response characteristic established a complementary logarithmic variation of video amplifier gain with frequency over said video amplifier characteristic portion.

8. In a color television receiver adapted for the reception of color television signals having a prescribed bandwidth and transmitted on a vestigial sideband modulated carrier, said television signals including luminance information, a suppressed carrier modulated color subcarrier and a sound modulated carrier, said color television receiver including at least a first detector, an intermediate frequency amplifier, a second detector, and at least a video amplifier channel, said second detector characterized in that cross-modulation distortion is produced due to the action of said second detector on said vestigial sideband modulated carrier, means for reducing said cross-modulation distortion comprising in combination, means for causing the logarithm of the gain of said intermediate amplifier to decrease linearly with respect to the modulating frequency over a predetermined portion of said prescribed bandwidth, means for causing the logarithm of the gain of said video amplifier to increase linearly with frequency over said predetermined portion of said prescribed bandwidth in a manner complementary to the decrease of the logarithm of the gain of said intermediate frequency amplifier.

9. In a color television receiver including a source of color television signals having a prescribed bandwidth and transmitted on a vestigial sideband modulated carrier, said television signals containing luminance information, a suppressed carrier modulated color subcarrier and a sound modulated carrier, a first detector coupled to said source, an intermediate frequency amplifier coupled to said first detector, a second detector coupled to said intermediate frequency amplifier, and a video amplifier coupled to said second detector, said intermediate amplifier and said video amplifier each having a bandwidth commensurate with said prescribed bandwidth of said color television signals, means for tuning said first detector to properly locate said vestigial sideband modulated carrier in said bandwidth of said intermediate frequency amplifier, means for causing the logarithm of the gain of said intermediate amplifier to decrease linearly with respect to the modulating frequency over a predetermined portion of said prescribed bandwidth, means for causing the logarithm of the gain of said video amplifier to increase linearly with frequency over said predetermined portion of said prescribed bandwidth in a manner complementary to the decrease of the logarithm of the gain of said intermediate frequency amplifier.

10. In a color television receiver adapted for the reception of color television signals having a prescribed bandwidth and transmitted on a vestigial sideband modulated carrier, said television signals including chrominance information including a suppressed carrier modulated color subcarrier and a sound modulated carrier, said color television receiver including at least a first detector, an intermediate frequency amplifier, a second detector, a chrominance video amplifier, said intermediate amplifier and said chrominance video amplifier each having a bandwidth commensurate with said prescribed bandwidth of said color television signals, said color television receiver including means for the tuning of said first detector to properly locate said vestigial sideband modulated carrier in said bandwidth of said intermediate frequency amplifier, means for minimizing distortion arising from off-tuning deviation of said first detector comprising in combination, means for providing said intermediate frequency amplifier with a frequency response characteristic such that the gain of said intermediate amplifier is nonlogarithmic with respect to modulating frequency for a first predetermined portion of said prescribed bandwidth corresponding to a range of lower modulating frequencies and such that the logarithm of the gain of said intermediate frequency amplifier decreases substantially linearly with respect to the modulating frequency over a second predetermined portion of said prescribed bandwidth corresponding to a range of a higher modulating frequency, means for providing said chrominance video amplifier with a frequency response characteristic such that the logarithm of the gain varies substantially linearly with respect to modulating frequency over said second predetermined portion of said prescribed bandwidth.

11. A color television receiver adapted for the reception of color television signals having a prescribed bandwidth and transmitted on a vestigial sideband modulated carrier, said television signals including chrominance information, including a suppressed carrier modulated color subcarrier, and a sound modulated carrier, said color television receiver including at least a first detector, an intermediate frequency amplifier, a second detector, and a chrominance video amplifier, means for providing said intermediate frequency amplifier with a frequency response characteristic such that the gain of said intermediate amplifier is nonlogarithmic with respect to modulating frequency for a first predetermined portion of said prescribed bandwidth corresponding to a range of lower modulating frequencies and whereby the logarithm of the gain of said intermediate frequency amplifier decreases linearly with respect to the modulating frequency over a second predetermined portion of said second prescribed bandwidth corresponding to a range of a higher modulating frequency, means for providing said chrominance video amplifier with a frequency response characteristic such that the logarithm of the gain varies substantially linearly with respect to modulating frequency over said second predetermined portion of said prescribed bandwidth to compensate for said logarithmic decrease in gain with respect to frequency in said intermediate frequency amplifier, a band rejection circuit, said band rejection characterized in that it attenuates modulating signal components in the vicinity of the sound modulated carrier, means for including said band rejection circuit in said chrominance video amplifier.

12. In a color television receiver adapted for the reception of color television signals having a prescribed bandwidth and transmitted on a vestigial sideband modulated carrier, said television signals containing luminance information, a suppressed carrier modulated color subcarrier and a sound modulated carrier, said color television receiver including at least a first detector, an intermediate frequency amplifier, a second detector, and a video amplifier, said intermediate amplifier and said video amplifier each having a bandwidth commensurate with said prescribed bandwidth of said color television signals, means for providing said intermediate frequency amplifier with a frequency response characteristic such that in the vicinity of said suppressed carrier quadrature modulated color subcarrier the logarithm of the gain decreases linearly with respect to frequency, and means for providing said video amplifier with a frequency response characteristic such that the gain in the vicinity of said suppressed carrier quadrature modulated color carrier increases with frequency.

13. The combination of, a source of signals comprising an intermediate frequency intelligence modulated carrier occupying a predetermined band of frequencies, an intermediate frequency amplifier having an input circuit coupled to said source and an output circuit and including apparatus for causing the logarithm of the gain provided by said intermediate frequency amplifier for said intermediate frequency intelligence modulated carrier to decrease linearly with frequency over a predetermined high frequency portion of said band, and signal utilization means coupled to said output circuit.

14. An amplifier comprising in combination, an amplifier channel, said amplifier channel having an input circuit, an output circuit, and first, second and third component amplifiers each having different responses, said amplifier channel output circuit including means for providing a combined response made up of the summation of said component amplifier responses, said first amplifier response yielded by a constant gain-versus-frequency characteristic, said second amplifier response yielded by a gain characteristic which increases linearly with respect to frequency, said third amplifier response yielded by a gain characteristic which increases in proportion to the square of the frequency, each of said amplifiers having an adjustable gain level control for individually varying the gain level of their respective said responses, the level control of each of said amplifiers being adjusted to cause the logarithm of the gain of said amplifier channel to increase linearly with respect to frequency over a predetermined frequency range.

15. An exponential frequency response video amplifier comprising in combination, a first amplifier having a frequency response wherein the gain is substantially constant with respect to frequency over a prescribed range, an input terminal and an output terminal, a second amplifier characterized by a frequency response wherein the gain increases linearly with respect to the frequency, a first multiplier circuit having two input circuits and one output circuit and characterized in that it yields multiplication of signals applied at both of its input circuits, a second multiplier circuit also having two input circuits and an output circuit and also characterized in that it yields the product of signals impressed at each of its input circuits, means for coupling said first amplifier between said input terminal and said output terminal, means for coupling said second amplifier between said input terminal and said output terminal, means for coupling the output of said second amplifier to both of the two respective inputs of the first multiplier circuit, means for coupling the output of said first multiplier circuit to said first output terminal, means for coupling said second amplifier and the output of said first multiplying circuit to the two respective inputs of said second multiplying circuit, means for connecting the output circuit of said second multiplying circuit to said output terminal, means for adjusting the gain levels of said first amplifier, said second amplifier, said first multiplying circuit and said second multiplying circuit whereby the frequency response of the signal appearing at said output terminal is characterized by substantially a curve wherein the logarithm of the gain increases linearly with respect to frequency.

16. A logarithmic frequency response video amplifier comprising in combination, a first video amplifier tube circuit including a pentode having an anode, a suppressor grid, a screen grid, a control grid, and a cathode, and an inductive load, means for connecting said inductive load to the anode of said pentode, an input terminal, means for coupling an input terminal to the control grid of said pentode, means for deriving from the screen grid of said pentode a signal having a response wherein the output is substantially flat with respect to frequency, means for coupling said anode to said inductive load to develop a response wherein the gain to said inductive load varies linearly with respect to the frequency, a multigrid electron tube having at least three control grids and an output circuit, means for coupling a signal from the screen grid of said pentode in said video amplifier circuit to one of the control grids of said multigrid electron tube, means for coupling a signal from said inductive output circuit of said video amplifier circuit to each of the two control grids of said multigrid electron tube, bias and potential means, means for adjusting said bias and potential means to cause the logarithm of the gain into the output circuit of said multigrid electron tube to increase approximately linearly with respect to frequency.

References Cited in the file of this patent

UNITED STATES PATENTS

| | | |
|---|---|---|
| 1,945,096 | Tellegen | Jan. 30, 1934 |
| 2,224,200 | Schieneman | Dec. 10, 1940 |
| 2,635,140 | Dome | Apr. 4, 1953 |
| 2,662,978 | Sunstein | Dec. 15, 1953 |
| 2,666,806 | Kalfaian | Jan. 19, 1954 |
| 2,680,147 | Rhodes | June 1, 1954 |
| 2,738,380 | Crosby | Mar. 13, 1956 |

OTHER REFERENCES

Compatible Color Receiver, Electronics, January 1953, pages 98–104.

Design Techniques for Color Television Receiver, Electronics, February 1954, pages 136–143.

RCA, Model CT–100, Service Data, March 1954, pages 31 to 34.